April 21, 1959
J. A. TAYLOR ET AL
2,883,345
EMULSION BREAKER
Filed Jan. 28, 1954
2 Sheets-Sheet 1
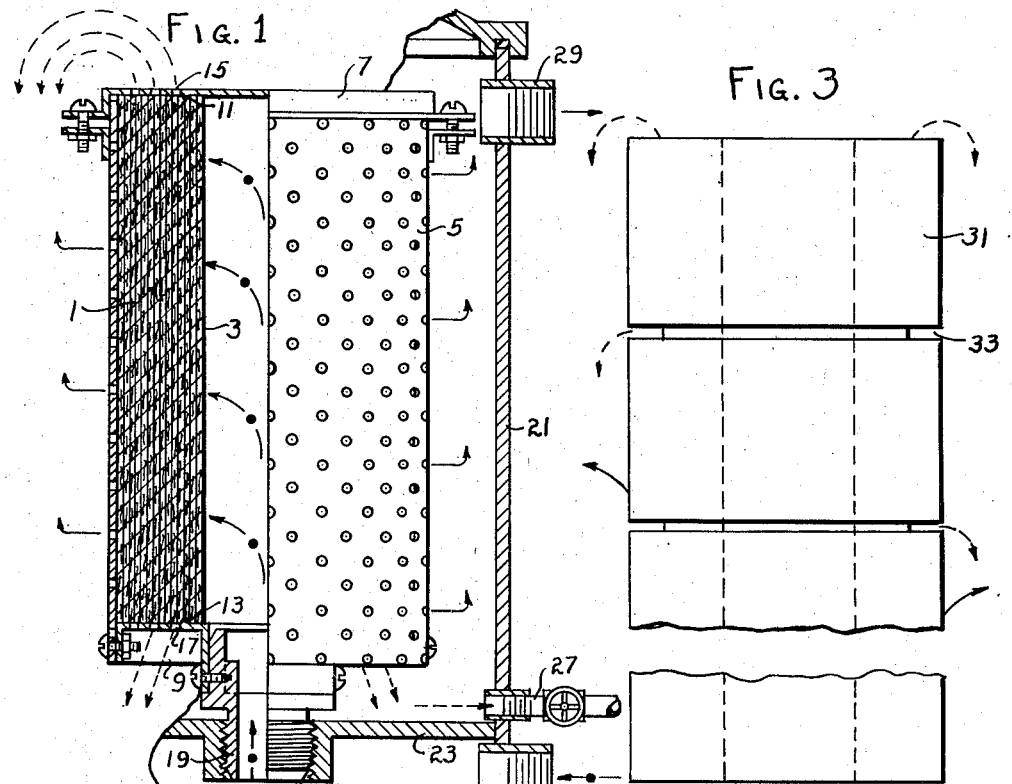
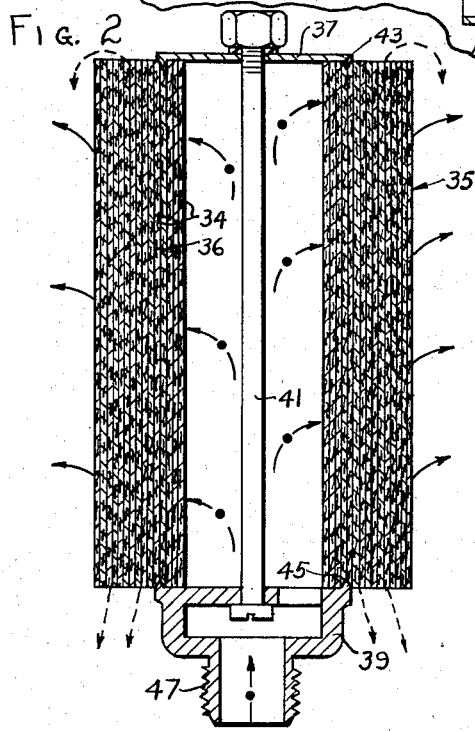
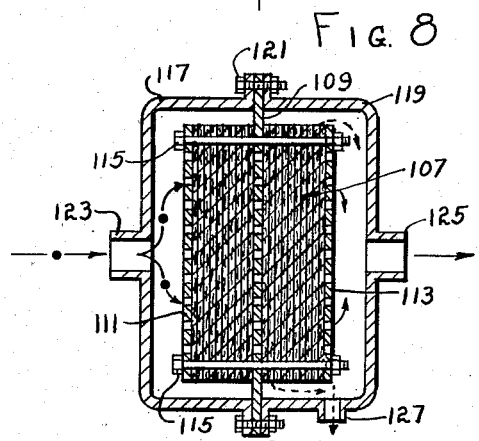
JACK A. TAYLOR
GEORGE J. TOPOL
INVENTOR.
BY Edmund W.E. Kanna
ATTORNEY

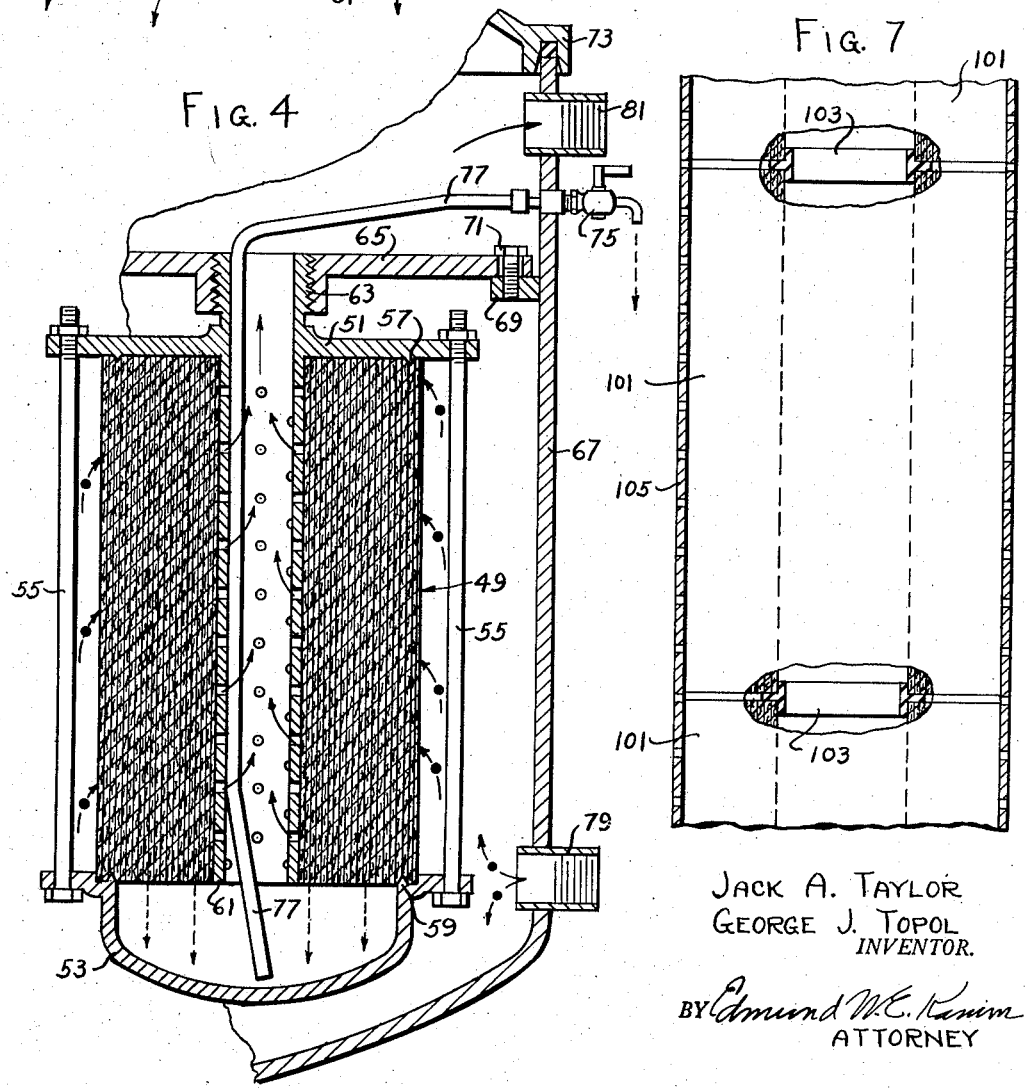

United States Patent Office 2,883,345
Patented Apr. 21, 1959

2,883,345

EMULSION BREAKER

Jack A. Taylor and George J. Topol, Hamilton, Ontario, Canada, assignors to Bowser, Inc., Fort Wayne, Ind., a corporation of Indiana Application January 28, 1954, Serial No. 406,840

20 Claims. (Cl. 252—360)

This invention relates to emulsion breakers. More specifically, it relates to improved means for continuously separating the continuous and dispersed phases of an emulsion, particularly one in which oil and water form the emulsion.

It has been disclosed in the prior art that the passage of an emulsion, particularly an oil and water emulsion through any one of a number of different media will cause the coalescence of the dispersed phase liquid into droplets at the discharge surface of such media where separation of the two liquids can occur by gravity.

Various media have been used, for example excelsior, fiber glass, waste, and other fibrous materials, usually in pack form.

Other designs have been made which employ sheet material stacked in a manner to permit passage of the emulsion edgewise of the material.

It has been a common experience however that the size of many of the droplets formed on the discharge surface of the media is so small that an additional medium must be provided for trapping and coalescing these droplets.

It has also been a well known fact that in many cases media which ordinarily are reliable and effective in separating the phases of an emulsion, suddenly begin to pass the emulsion. The reasons for this effect are not understood.

It has heretofore been the general practice in the art to use relatively thick beds or packs to effect the separation with the result that the flow per unit of area of input surface of the pack is limited and attempts to increase the rate of flow per unit area are defeated by the passage of unseparated emulsion from the discharge side.

Accordingly, an object of the invention is to provide an emulsion breaker in the form of an expendable element.

Another object of the invention is to provide an emulsion breaker element in which provision is made for the free escape, from the interior of the element, of the water separated from the emulsion.

Yet a further object of the invention is to provide an emulsion breaker element in which a series of distinct, relatively thin sheets of an emulsion breaking medium are arranged transversely to the flow of the emulsion and escape passages are provided between the various sheets.

Still another object of the invention is to provide an emulsion breaker element which comprises a laminar emulsion breaking medium, the individual laminations being spaced to provide channels for the escape of one of the constituents of the emulsion.

A further object of the invention is to provide an emulsion breaker cartridge formed in laminated sheets of resin impregnated paper.

It is another object of the invention to provide an emulsion breaker cartridge of a convolutely wound emulsion breaking medium.

Another object is to provide a cartridge formed of a convolutely wound emulsion breaking medium, some of the layers being spaced by a coarse medium which affords ready passage of at least one constituent of the emulsion parallel to the layers.

Yet another object is to provide a convolute cartridge of an emulsion breaking medium and a coarse medium, in which the surfaces of the two media are bonded together.

A further object of the invention is to provide a laminated emulsion breaking element of considerable size which is interrupted by slots which extend into the laminations from the discharge surface so as to intersect the passages between adjacent laminae.

Still another object of the invention is to produce an emulsion breaker device in which an emulsion breaking medium is arranged in a laminated form of element and which is supported by sealing means so as to permit emulsion to be applied under pressure to one surface and one constituent to be discharged from the opposite surface, said sealing means being arranged to expose the edges of a considerable portion of the laminations adjacent the discharge surface to permit the discharge of the other constituent from the element at said edges.

These and other objects will become apparent from a study of this specification and the drawings which are attached hereto, are made a part hereof and in which:

Figure 1 is an elevation, partly in section, showing an emulsion breaking element comprising a convolutely wound, unbonded, emulsion breaking cartridge.

Figure 2 is a sectional view showing an element comprising a convolutely wound, bonded cartridge formed of interwound emulsion breaking and drainage media.

Figure 3 is an elevation showing a long emulsion breaking cartridge similar to that of Figure 1 or 2, which is grooved at spaced points to provide outlets for one of the separated phases.

Figure 4 is a sectional view of an emulsion breaking element having the cartridge positioned for outside-in flow.

Figure 5 is an elevation of a long, horizontal element in which the cartridge is slotted only on the lower side.

Figure 6 is is an end elevation of the structure of Figure 5 showing the escape passages for one separated phase in the lower portions of the heads only.

Figure 7 is an elevation, partly in section, showing a long element made up of a plurality of short cartridges with sealing and spacing rings.

Figure 8 is an elevation, partly in section, of an emulsion breaker element employing a flat element.

Definitions

It is our intention to use the word "element" to designate the entire assembly which includes the "cartridge" and its supporting, attaching, sealing, connecting elements, etc. The word "cartridge" is used to refer to that portion of the element which effects the separation of the emulsion into its phases and discharges them into the collection spaces. The terms "medium" and "media" are intended to refer to the components of the cartridge. The term "emulsion breaking" is used to mean the separation of the emulsion into its constituent fluids. The term "emulsion" is used to refer to either an emulsion of two liquids or of a liquid and air.

Convolute-unbonded cartridge (Fig. 1)

Referring first to Figure 1, the numeral 1 indicates the cartridge which is formed by winding a sheet of emulsion breaking medium about a mandrel and, if desired cementing the terminal flap to the cartridge to hold it in the wound position.

This medium may be any of a number of different types of materials. We prefer to use a resin impregnated sulphite pulp paper, which is similar to that used for disposable handkerchiefs. The sheet is made from a number of separate laminations, each of which is about .0025 inch thick. Any of the usual or conventional thermosetting resins may be used to impregnate the paper. A phenol formaldehyde resin is preferred because of its low cost. Paper is preferred over other media for this reason also. The medium is preferably convolutely wound, in its dry state as received from the mill, without the addition of any solvent. The resin of the last inch or so of the sheet may be moistened so that it will stick to the remainder of the cartridge and keep it from unrolling. Thereafter, the cartridge is baked to polymerize the resin and render it insoluble. The time and temperature used in the baking step is variable depending upon the type and amount of resin used and is well understood in the art of filter media.

The cartridge thus produced does not have the contiguous faces of the convolute turns bonded together and consequently the interfacial spaces provide more or less direct passages longitudinally of the cartridge. The resistance to the flow of liquid along such passages appears to be less than the resistance afforded to the flow through the sheet itself.

The radial dimension of the passages may be varied somewhat by the amount of tension applied to the sheet as the cartridge is wound.

The cartridge formed as described does not have the strength which is afforded by a cartridge in which all of the contiguous surfaces are bonded together by the resin. However, additional strength can be obtained by wetting the first few wraps of paper with solvent and if desired, wetting occasional intermediate convolutions with solvent.

In any case, to prevent damage to the cartridge from the bursting effect of the liquid which is admitted to the hollow center portion 3 of the cartridge, the cartridge may be housed in a basket 5 which is fitted with two heads 7, 9 respectively.

The basket may be of perforated metal, wire or other suitable, pervious material.

The heads 7 and 9 are provided with means for sealing the ends of the cartridge to prevent the passage of liquid radially between the head and the ends of the cartridge. While numerous well known expedients may be resorted to, we prefer to provide the heads with a circular bead or projection 11, 13 which indents the end of the cartridge.

Radially outwardly of the beads, the heads are perforated as at 15, 17 to permit one of the separated phases of the emulsion to discharge through the heads.

The head 9 is provided with a suitable nozzle 19 for the admission of the emulsion to the interior of the element. The element is supported in a tank 21, having a deck plate 23 in which the nozzle is received. The tank is fitted with an emulsion inlet 25, a drain 27 for the heavy phase and an outlet 29 on the lighter phase liquid.

As shown in Figure 1, the dot-dash arrows indicate the path of an emulsion such as an oil and water emulsion in which the water is the dispersed phase. The solid line arrows running from the sides of the element indicate the oil phase effluent and the dashed line arrows at the ends of the element indicate the water phase effluent.

Actual tests indicate little or no flow of the oil from the ends of the element and no flow of water from the side walls of the element.

So long as the flow rate is maintained below that which will produce a high velocity of effluent from the ends of the element, the droplets falling from the lower end of the element will be comparatively large so that they will gravitate to the bottom of the container without being broken up and entrained in the oil. The drops formed at the top of the element are even larger than those discharged at the bottom since they tend to lie on top of the element and coalesce with other drops which are discharged until finally the collected body of water breaks and pours in a stream over the edge of the head. Other large drops roll toward and finally over the edge of the head and descend to collect in the bottom of the chamber which houses the element.

While the reasons for the passage of one of the phases through the layers of the medium forming the cartridge while the other phase passes in a direction parallel and between the layers is not understood, it has been firmly established by tests that the droplets of the dispersed phase liquid are much larger than they are when the entire quantity of liquid is forced through the medium and the differential pressure created by the same flow rate is substantially less.

Further, it has been established that the separation of the phases is more efficient in that an emulsion which could not be entirely separated by the prior art types, this fact being evidenced by a cloudy effluent, the instant cartridge will produce a brilliant effluent from the same emulsion.

*Long cartridge—slotted (Fig. 3)*

It has been noted from tests that when a long cartridge 31 such as that shown in Figure 3 is used or if the rate of flow of emulsion to the element is too great, or if the ratio of the quantity of dispersed phase liquid to continuous phase liquid is high for a given flow rate, the velocity of effluent from the ends of the cartridge is so great that the droplets are broken up and thus reduces the efficiency of the element since the small droplets become entrained in the continuous phase fluid.

Since this effect apparently results from the discharge of too great a quantity of dispersed phase fluid from a limited area, the difficulty was solved by cutting slots 33 into the element to a portion of the thickness of the cartridge. The dispersed phase liquid was discharged from the slots in large droplets and also from the ends. The velocity of the effluent from the ends was greatly reduced. It is to be noted that the only effect of different widths of the slots 33 was that the droplets formed from wider slots were somewhat larger than those from the narrower slots.

*Convolute—bonded cartridge (Fig. 2)*

As noted in connection with the cartridge shown in Figure 1, it was stated that the structural strength of the element was not great. In order to produce a stronger cartridge, we have formed one as shown in Figure 2, in which several turns of a medium 34 which is impregnated with a thermo setting resin, moistened with solvent, are wrapped. Thereafter, a sheet of a medium 36 which is suitable for drainage of one of the phases is placed on the surface of the first mentioned medium and the two media are wound together, solvent being applied to the resin on the surfaces of the first medium all the time. The cartridge is finished by severing the drainage medium and continuing with a turn or more of the first medium, which being moistened with solvent will hold the roll in shape.

Thereafter the resin is polymerized by heating for the required length of time so that the bonding of one layer to another throughout the cartridge is effected. Such a cartridge, shown at 3, Figure 2, has more rigidity and strength than the unbonded type first described.

This rigidity permits an element to be made of this cartridge by simply supplying heads 37, 39 to the cartridge and holding them in place thereon by a tie rod 41. The heads are provided with suitable sealing means to prevent radial passage of liquid between the heads and the ends of the cartridge. As shown in Figure 2, the sealing means on each head may comprise a ring shaped bead 43, 45 which serves to indent the cartridge.

The head 39 may be provided with a nozzle 47 or other inlet so that it may be mounted in a tank in a manner similar to Figure 1.

The emulsion breaker medium used may be any of those discussed in connection with Figure 1. The drainage medium may be any rather coarse fibrous material, wire mesh, or even a rather thick pad of the same sulphite paper used for the emulsion breaking medium but without resin impregnation.

We prefer however to use a 4 lb. starch bonded sheet of glass fibers which is about .010 inches thick and quite open. This material is readily bonded to the breaker medium by the resin.

The operation of this element is substantially the same as that of the previously described element. The dot-dash arrows indicate the path of the emulsion, the solid arrows the path of the one separated phase and the dashed arrows the path of the other separated phase. In the case of a water in oil emulsion, the water leaves at the ends of the cartridge.

This form of cartridge may also be slotted as shown in Figure 3 when the length or other factors are such that the velocity of fluid discharged from the ends of the cartridge is too great to permit the formation of droplets or bubbles of large size.

Convolute, outside-in element (Fig. 4)

One of the inherent disadvantages of the elements shown in Figures 1 and 2 is that since the flow is inside-out, a small area is exposed to the incoming emulsion and this becomes plugged with entrained solids. The life of the unit would be lengthened if the area of this surface could be increased.

To provide an element which has a longer life, we have arranged the cartridge 49, which may be constructed in accordance with any of the foregoing teachings, between the heads 51, 53. Tie bolts 55 hold the heads in place on the cartridge and force and hold the sealing beads 57, 59 in sealing relation with the ends of the cartridge. It should be noted that the beads are disposed adjacent the outer edge of the cartridge in this case and that the head 53 is cupped or dished adjacent the bead to form a receptacle for the heavier of the separated phases. The upper end of the cartridge is preferably sealed off by the center tube 61 and head 51. The center tube is perforated to permit the passage of one separated phase.

In this form the head 51 is provided with an outlet nozzle 63 which is mounted in a deck plate 65. The latter is supported in the tank 67 on a flange 69 by screws 71. A cover 73 fits the tank and is held down by any suitable means, not shown.

A pet cock 75 is screwed in the side of the tank and a length of conduit 77 such as plastic tubing is attached in communication with the cock while the free end is inserted in the center tube and rests upon the bottom of the head 53.

The inlet 79 to the tank is disposed below the deck plate and the outlet 81 for the lighter phase is disposed above the deck plate.

In operation, the emulsion enters the tank through 79 and passes outside-in through the cartridge 49, as shown by the dot-dash arrows. The lighter phase of the emulsion passes through the layers of medium into the center tube, up through the nozzle 63 and from the tank through 81 as shown by the solid line arrows. The heavier phase leaves the bottom end surface of the cartridge and settles into the sump formed by the bottom head 53, as shown by the dashed line arrows.

Periodically, while the tank 67 is under pressure, the pet cock 75 is opened and the liquid collected in the sump will be pushed through tube 77 and discharged outside of tank 67.

Horizontal convolute element (Figs. 5–6)

The element shown in Figures 5 and 6 is similar to that shown in Figure 2 but the heads 83, 85 extend entirely across the ends of the cartridge 87 and only the lower portions of the heads are provided with perforations 89 to permit the discharge of the axially flowing phase.

Also, should the cartridge be a long one, it may be slotted at 91 but preferably only along the lower side so as to minimize the chances of the drops being broken up by jets of liquid issuing from the lateral surfaces of the cartridge.

The head 85 is fitted with the nozzle 93 and the heads are drawn together with a tie rod 95. The sealing beads 97, 99, or equivalent means, are used to prevent the emulsion from by-passing the ends of the cartridge.

The emulsion enters the nozzle as shown by the dot-dash arrows; the one separated phase passes radially through the cartridge as shown by the solid arrows and the other phase of the emulsion passes axially of the cartridge and out of the holes 89 and slot 91 as shown by the dashed line arrows.

Built-up element (Fig. 7)

Instead of forming a long cartridge and slotting it, as shown in Figure 3, to provide adequate escape channels for the axially travelling fluid, we may use a number of cartridges 101 of the type shown in Figure 1 or Figure 2 which are short in length and stack them endwise.

Preferably a gasket 103 of T-shaped cross-section is inserted between each contiguous pair of cartridges in order to seal the upper ends of the inner turns of medium. Since this cartridge is also of the inside-out type, an exterior cage 105 is provided and suitable heads (not shown) similar to those of Figure 1 may be used to seal the end cartridges and to hold the gaskets 103 compressed to seal the joints between the individual cartridges.

The flow of fluids is similar to that in the other inside-out units, one phase going radially through the cartridges and cage and the other going axially of the cartridges.

Flat type element (Fig. 8)

Instead of being formed as a convolutely wound cartridge, the individual sheets of the medium or media may be formed in a stack or pile 107 with a partition or seal member 109 inserted at the proper level of the pile. Suitably perforated support plates 111, 113 may be disposed adjacent the inlet and discharge surfaces of the element and clamping means, such as bolts 115 may be used to hold the pile compressed.

The seal member 109 may be clamped between two parts 117, 119 of the case or tank by bolts 121. The tank part 117 has the inlet 123 for emulsion while the other part 119 has the outlet 125 for the lighter liquid and the outlet 127 for the heavier liquid.

As shown in Figure 8, the emulsion, indicated by the dot-dash arrows, passes through the medium or media from left to right and the one separated phase, indicated by the solid arrows, continues in the same direction until it leaves by the outlet 125, while the other separated phase travels parallel to the sheets or laminae disposed in the case part 119 and issues, as shown by the dashed line arrows, from the port 127.

Gas separation

Any of the forms of the invention disclosed above are capable of separating an emulsion or foams of gas and a liquid. In such an apparatus, the gas appears to follow a path parallel to the sheets of the medium or media, while the liquid passes through the sheets.

It would, of course, be necessary, in each case where the element is used for separation of gas and liquid to dispose the gas outlet at the highest point in the case rather than at a low point as in the case where a heavy liquid is to be evacuated.

It is obvious that various changes may be made in the form, structure and arrangement of parts without departing from the spirit of the invention. Accordingly, applicants do not desire to be limited to the specific embodi-

What we claim to be new and desire to protect by Letters Patent of the United States is:

1. An element for breaking a colloidal dispersion in a liquid of a fluid immiscible with said liquid comprising, in combination, a number of laminations of a porous resin impregnated sheet, disposed in surface contacting layers to form a cartridge having spaced inlet and outlet surfaces and exposed edges, sealing means disposed in sealing relation to certain of the exposed edges so as to prevent communication between the edges disposed between the sealing means and the inlet surface and the outlet surface respectively, means for supplying said colloidal dispersion to the inlet surface so that one of the constituent fluids will flow through the laminations of the material and from the outlet surface and another will flow parallel to the laminations and from the edges which are disposed between the sealing means and the outlet surface.

2. The apparatus as set forth in claim 1 wherein said sheet is a porous paper impregnated with a polymerized resin.

3. The apparatus as set forth in claim 1 wherein said sheet is a porous paper impregnated with a polymerized resin and there is no bond between the layers disposed immediately adjacent the sealing means on the outlet side thereof.

4. The apparatus as set forth in claim 1 wherein the laminations of said sheet are convolutely wound to form the cartridge.

5. The apparatus as set forth in claim 1 wherein the laminations of said sheet intermediate the inlet and outlet surfaces comprise alternate layers of said sheet and a drainage medium.

6. The apparatus as set forth in claim 1 wherein the laminations of said sheet intermediate the inlet and outlet surfaces comprise alternate layers of porous paper impregnated with polymerized resin and a drainage medium, said layers being bonded together by the resin to form a unitary structure.

7. The apparatus as set forth in claim 1 wherein the laminations of said sheet intermediate the inlet and outlet surfaces comprise alternate layers of a porous paper impregnated with polymerized resin and starch bonded fiberglass, said layers being bonded together by the resin to form a unitary structure.

8. The apparatus as set forth in claim 1 wherein the cartridge is provided with grooves spaced from the edges and extending from the outlet surface toward but terminating short of the inlet surface, to provide additional exposed edges of said sheet for drainage of the constituent fluid which flows parallel to the laminations.

9. The apparatus as set forth in claim 1 wherein the outlet surface is supported by a perforated supporting means.

10. The apparatus as set forth in claim 1 wherein the cartridge is formed as a hollow cylinder and the said colloidal dispersion is supplied to the exterior surface of the cartridge, said element comprising a chamber for receiving the constituent of the said colloidal dispersion which flows parallel to the laminations and a conduit, communicating with the interior of the chamber and with a space which is under less pressure than the chamber, for unloading the chamber.

11. The apparatus as set forth in claim 1 wherein the cartridge is built up of a number of superposed, short cartridges and the sealing means comprises a compression gasket member disposed between the adjacent ends of the superposed short cartridges.

12. The apparatus as set forth in claim 1 wherein the cartridge is built up of a number of superposed, short cartridges and the sealing means comprises a compressible T-shaped gasket member which is disposed with its central leg between the adjacent ends of the superposed short cartridges and with its other legs overlapping a portion of the inlet surfaces of the adjacent cartridges.

13. The apparatus as set forth in claim 1 wherein the cartridge is disposed horizontally and provided with grooves extending from the outlet surface toward but terminating short of the inlet surface, said grooves extending for only the lower part of the circumference of the cartridge.

14. The apparatus as set forth in claim 1 wherein the cartridge is disposed horizontally and provided with a head at each end which sealingly engages the exposed edges of said sheet, the lower portion of said heads being provided with perforations communicating with the edges of the material to permit the escape of the fluid flowing parallel to the laminations.

15. The apparatus as set forth in claim 1 wherein the cartridge is formed as a vertical hollow cylinder and the said colloidal dispersion is supplied to the exterior surface of the cartridge, said element including a perforated center tube for supporting the cartridge, a dished lower head disposed in communication with the lower edges of the cartridge between the sealing means and the outlet surface so as to receive the fluid flowing parallel to said laminations, said center tube having an outlet and a scavenging tube disposed in said center tube and communicating with said dished head.

16. The apparatus as defined in claim 1 wherein the said sheet is tightly wrapped in a convolute roll and at least the terminal portion of the material is bonded to the cartridge to retain the cartridge in wound condition.

17. The apparatus as defined in claim 1 wherein said sheet is tightly wrapped in a convolute roll, a number of the initial convolutions being bonded together to form a rigid core and a number of the terminal convolutions are bonded together to form an integral outer shell.

18. The apparatus as defined in claim 1 wherein the initial portion of said sheet is wrapped as a convolute roll, the convolutions being bonded together to form a rigid core, the central portion is formed of alternate convolutions of said medium and a drainage medium tightly wound together and the final portion is formed of at least one convolution of the breaking medium bonded so as to hold the cartridge in convolute form.

19. The apparatus as set forth in claim 1 wherein the inlet and outlet surfaces are supported by a perforated wall.

20. The apparatus as set forth in claim 1 wherein the inlet and outlet surfaces are each supported by a pervious wall and means are provided for compressing said material between said walls.

References Cited in the file of this patent

UNITED STATES PATENTS

| | | |
|---|---|---|
| 1,980,722 | Garrison et al. | Nov. 13, 1934 |
| 2,084,958 | Hunter | June 22, 1937 |
| 2,405,838 | Lawson et al. | Aug. 13, 1946 |
| 2,609,932 | Fricke | Sept. 9, 1952 |
| 2,657,808 | Mankin | Nov. 3, 1953 |